A. G. CONNELLY.
DEVICE FOR REMOVING STONES OR SEEDS FROM FRUITS OR VEGETABLES.
APPLICATION FILED MAR. 10, 1916.
1,230,123. Patented June 19, 1917.
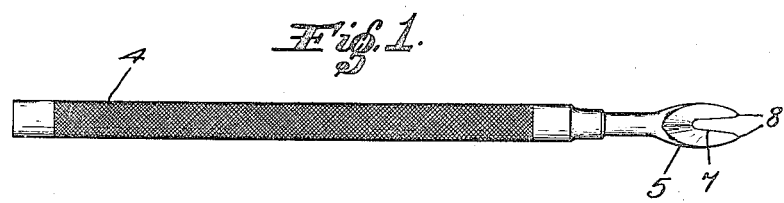
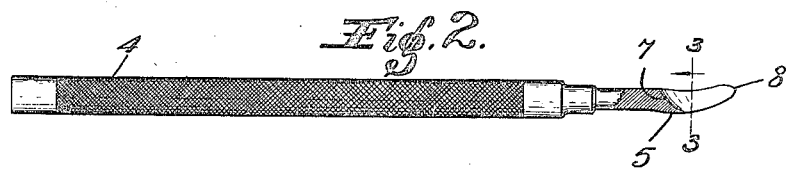
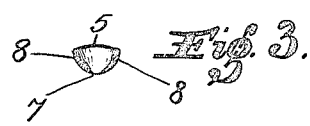

UNITED STATES PATENT OFFICE.

ALMA G. CONNELLY, OF CLEVELAND, OHIO.

DEVICE FOR REMOVING STONES OR SEEDS FROM FRUITS OR VEGETABLES.

1,230,123. Specification of Letters Patent. Patented June 19, 1917.

Application filed March 10, 1916. Serial No. 83,278.

*To all whom it may concern:*

Be it known that I, ALMA G. CONNELLY, a citizen of the United States of America, residing at Cleveland, in the county of Cuyahoga and State of Ohio, have invented certain new and useful Improvements in Devices for Removing Stones or Seeds from Fruits or Vegetables; and I hereby declare the following to be a full, clear, and exact description of the invention, such as will enable others skilled in the art to which it pertains to make and use the same.

This invention relates to new and useful improvements in devices for removing the pits, stones or seeds from fruits and vegetables, and more particularly to removing the pits of cherries.

The object of the invention is to provide a device of this character by means of which the pits, stones or seeds can be readily removed with the least possible mutilation or injury to the meat or body of the fruit or vegetable operated on.

A further object of my invention is to provide a device of this character which can be cheaply manufactured, easily kept in a serviceable condition and readily cleaned.

With these objects in view, and with the intention of securing other advantages which will hereinafter appear, my invention consists in the features of construction and combination of parts hereinafter described in the specification, particularly pointed out in the claim and illustrated in the accompanying drawings.

Referring to the accompanying drawings, Figure 1 is a plan view of a device embodying my invention. Fig. 2 is a side elevation of the same. Fig. 3 is a section on line 3—3, Fig. 2.

Again referring to the drawings, 4 represents the handle portion of my device which may be of any shape or form suitable for readily grasping or holding in the hand and may be plain or ornamental as desired.

The cutting portion comprises a dish-shaped portion 5 which is provided with a centrally arranged slot or bifurcation 7 which extends inwardly beyond the central portion thereof forming two prongs, shown at 8. Each prong is provided with a cutting edge which extends around both sides and to the point of the prong. Each prong is also concave on its inner surface and convex on the outer surface. The two prongs together with the rear part of the dish-shaped body portion form a bowl adapted to receive the pit or stone which is to be removed and the prongs themselves form cutting blades which readily enter the fruit and cut the meat cleanly and evenly away from the stone without mutilating the meat. When the stone has been disengaged from the meat, it is received in the hollow between the prongs and the rear portion and can be readily withdrawn from the fruit. The cutting edges of the prongs can be easily sharpened when they become dull through service, and the device itself can be easily cleaned and kept in a sanitary condition.

What I claim is:—

A device for removing pits from fruits comprising a handle portion and an integrally formed pit-removing portion, the pit-removing portion comprising an oval dish shaped member having a centrally arranged slot in the bottom thereof and in line with the axis of the handle and dividing the dish shaped portion into two prongs, the adjacent sides of the prongs being provided with cutting edges and the rim of the dish having a cutting edge, for the purpose set forth.

In testimony whereof, I sign the foregoing specification, in the presence of two witnesses.

ALMA G. CONNELLY.

Witnesses:
A. L. CONNELLY,
V. C. LYNCH.